US011852188B1

(12) United States Patent
Chow et al.

(10) Patent No.: US 11,852,188 B1
(45) Date of Patent: Dec. 26, 2023

(54) OMNI DIRECTIONAL BREAKAGE JOINT FOR A MOBILE ROBOT MAST

(71) Applicant: Amazon Technologies, Inc., Seattle, WA (US)

(72) Inventors: Patrick Chow, Issaquah, WA (US); Javor Gnjidic, Seattle, WA (US); Alexander M. Frenkel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/931,624

(22) Filed: Sep. 13, 2022

(51) Int. Cl.
  *B25J 5/00* (2006.01)
  *F16C 11/06* (2006.01)
  *B25J 17/00* (2006.01)
  *B25J 19/02* (2006.01)

(52) U.S. Cl.
  CPC .......... *F16C 11/0623* (2013.01); *B25J 5/007* (2013.01); *B25J 17/00* (2013.01); *B25J 19/02* (2013.01)

(58) Field of Classification Search
  CPC . B25J 9/1623; B25J 19/02; B25J 17/00; B25J 5/007; F16C 11/0623
  See application file for complete search history.

(56) References Cited

U.S. PATENT DOCUMENTS

| 5,487,522 A * | 1/1996 | Hook ........................ B60R 1/04 248/483 |
| 11,300,963 B1 * | 4/2022 | Webster ............... G05D 1/0223 |
| 11,345,052 B1 * | 5/2022 | Johnston ................ B25J 18/025 |

FOREIGN PATENT DOCUMENTS

| DE | 102009042014 A1 * | 3/2011 | ............ B25J 13/089 |
| DE | 102010018095 A1 * | 10/2011 | ........... B23Q 1/5462 |
| WO | WO-2013032261 A1 * | 3/2013 | .......... F16C 11/0604 |

* cited by examiner

*Primary Examiner* — Randell J Krug
(74) *Attorney, Agent, or Firm* — Eversheds Sutherland (US) LLP (57) ABSTRACT

A mobile robot (for example, a robot used for package deliveries, among other purposes) may include a mast with a visual indicator for providing visibility to drivers and pedestrians in the environment proximate to the mobile robot. The mast may produce a large moment arm, which may result in the mast being more likely to break off from the robot. To mitigate or prevent damage to any components of the mast and/or the mobile robot when such a breakage occurs, described herein is an omni directional breakage joint that is used to connect the mast to the mobile robot. The omni directional breakage joint comprises multiple ball and socket joints that provide structural support between the mast and the mobile robot, while simultaneously allowing for a certain movement freedom of the mast and allowing for the mast to easily be engaged and disengaged from the mobile robot without causing damage to any components.

18 Claims, 9 Drawing Sheets

OMNI DIRECTIONAL BREAKAGE JOINT FOR A MOBILE ROBOT MAST

BACKGROUND

Delivery robots may be used for purposes such as performing last-mile deliveries of packages along a delivery route. Such robots may be semi-autonomous or autonomous and may traverse sidewalks and public roadways. To increase visibility of a delivery robot to nearby drivers and/or pedestrians, a mast may be provided on the robot that extends vertically from the base of the robot. The mast may also include one or more lighting elements that may emit various colors and/or light patterns to communicate information to the nearby drivers and/or pedestrians. For example, the lighting elements may provide such illuminations to indicate an intended motion of the robot to the drivers and/or pedestrians. However, in order to provide proper visibility to the drivers and/or pedestrians, the mast may need to be constructed to be above a certain height. Given that the mast may be relatively tall compared to the base of the robot, the mast may produce a large moment arm, which may result in the mast being more likely to break off from the robot.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

This disclosure relates to, among other things, an omni directional breakage joint for a mobile robot mast. The omni directional breakage joint (also referred to herein as a "mast connector") is provided at the base of the mast at an interface between the mast and the mobile robot. Traditional mounting mechanisms (for example, snaps or fasteners) may be more likely to result in the fracturing of plastic parts in the mast when an event leading to a breaking of the mast from the mobile robot 102 occurs (for example, when a sufficiently large moment arm is generated by the mast and/or a sufficiently large external force is exerted on the mast). This may require parts to be replaced in the mobile robot and/or the mast when the mast breaks from the mobile robot. The omni directional breakage joint may allow the mast to absorb and react to impacts from any direction without causing structural damage to the mast and/or the mobile robot. The mast may also be configured to be re-attached to the mobile robot through tool-less installation methods, which may allow for easier re-installation of the mast to the mobile robot if the mast is disengaged from the mobile robot.

In one or more embodiments, the omni directional breakage joint comprises two ball and socket joints that are used to removeably attach the mast to the mobile robot. Ball and socket joints have the unique property of providing a fixed translational degree of freedom while allowing some or all rotation to be freely performed. Using multiple ball and socket joints may provide more structural support than a single ball and joint socket because multiple points of connection are provided between the mast and the mobile robot. However, even with the use of multiple ball and socket joints, as soon as the mast experiences an impact (or a generated moment arm) that surpasses a holding force of the ball and socket joints, one or both of the ball joints may be dislodged from one or more of the sockets, providing the movement freedom of the mast to prevent any further breakage of the mast or of the mobile robot as the impact event continues.

Figure 1:
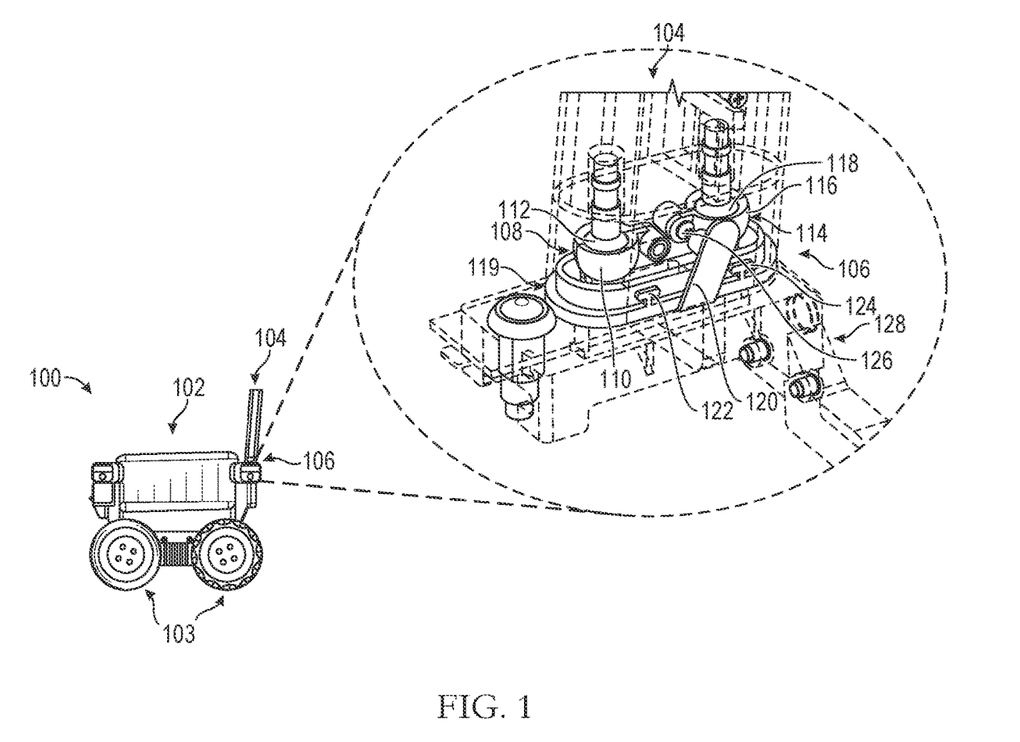
FIG. 1 is an illustration of an example mast connector for a mobile robot in accordance with one or more example embodiments of the disclosure.

FIG. 1 is an illustration of an example mast connector 106 for a mobile robot 100 in accordance with one or more example embodiments of the disclosure.

The mobile robot 100 may be a semi-autonomous or autonomous robot that may traverse an environment. For example, in some instances, the mobile robot 100 may be a delivery robot that may perform "last-mile" package deliveries. However, this is simply one non-limiting example use case for the mobile robot 100 and the mobile robot 100 may also be used for any other purposes as well.

In one or more embodiments, the mobile robot 100 may comprise at least a base 102 and a mast 104. The base 102 and the mast 104 may be removeably connected to one another through a mast connector 106. In one or more embodiments, the mast 104 may be connected to a mounting bracket 128 that may be fastened to the base 102. However, the mast 104 may also be directly connected to the base 102 as well. As used herein, the base 102 may simply refer to any portion of the mobile robot 100 besides the mast 104 and the mast connector 106. Additionally, in some cases, the terms "base" and "mobile robot" may also be used interchangeably.

The mobile robot 100 may also include one or more wheels 103 that may be used by the mobile robot 100 to traverse an environment. However, this is merely one non-limiting example configuration of a mobile robot 100 and the mobile robot 100 may also be any other shape and/or size and may include any other components as well. As one example, the one or more wheels 103 may instead be a continuous track.

Figure 2A:
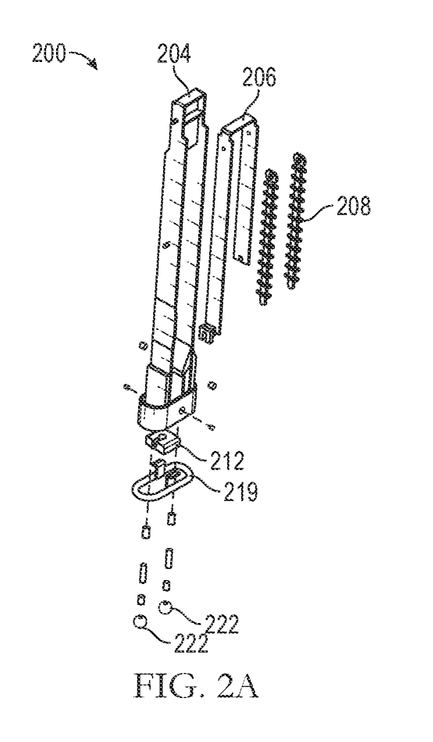
FIG. 2A is an illustration of an exploded view of the mast in accordance with one or more example embodiments of the disclosure.

The mast 104 may be a component that is used to provide enhanced visibility to the mobile robot 100. That is, the mast 104 may be used to provide notice to nearby pedestrians and/or vehicle drivers that the mobile robot 100 is traversing the environment. Given this, the mast 104 may need to be a requisite length to provide sufficient visibility of the mobile robot 100 to such pedestrians and/or vehicle drivers. The mast 104 may comprise any number of different types of materials, such as metals, plastics, etc. Additional details about the mast 104 are provided with respect to at least FIGS. 2 and 4.

Figure 5:
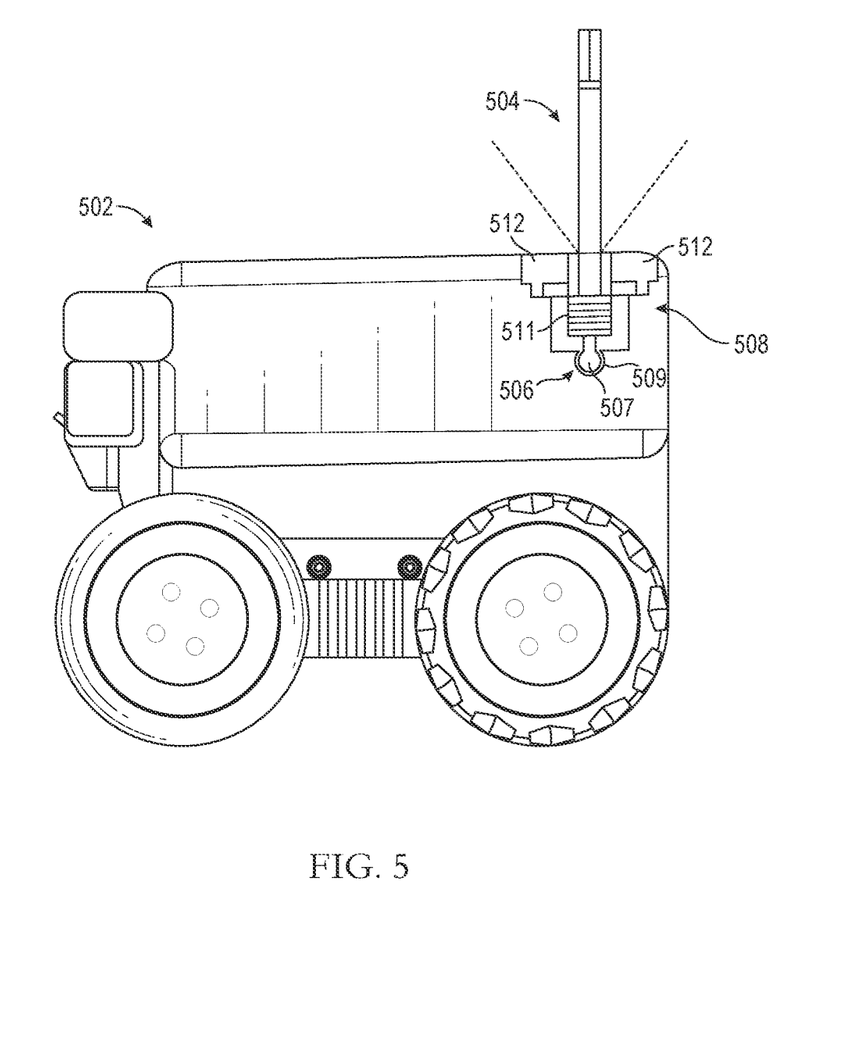
FIG. 5 illustrates a schematic of another embodiment of a mast connector in accordance with one or more example embodiments of the disclosure.

The mast 104 may also include a lighting element (not shown in FIG. 1, but shown in at least FIGS. 2 and 5). For example, the lighting element may comprise one or more light emitting diodes (LEDs) that may be configured to emit light in various patterns, colors, etc. (the lighting element is described in additional detail with respect to FIG. 2). The lighting element may provide even further visibility to the mobile robot 100 (for example, in low ambient light conditions when even the mast 104 may not provide sufficient visibility). The lighting element may also be used to provide nearby pedestrians and vehicle drivers with information about the movement intent of the mobile robot 100. For example, the lighting element may be configured to illuminate red to indicate that the mobile robot 100 is braking. As another example, the lighting element may be configured to produce a particular illumination pattern to indicate that the mobile robot 100 will be making a left turn. These are merely examples, and the lighting element may be configured to illuminate in any other manner to provide any number of different types of information to pedestrians and/or vehicle drivers in the environment.

While reference is made herein to providing visibility and communicating information to pedestrians and/or vehicle drivers, this is not intended to be limiting. For example, the visibility and information may also be provided to vehicles, other mobile robots traversing the environment, smart infrastructure in the environment, and/or any other types of users, systems, devices, etc.

In one or more embodiments, the mast connector 106 may comprise one or more ball and socket joints (for example, a first ball and socket joint 108, a second ball and socket joint 114, and/or any other number of ball and socket joints). A given ball and socket joint may comprise an individual ball joint and an individual socket. For example, ball and socket joint 108 may comprise ball joint 112 and socket 110 and ball and socket joint 114 may comprise ball joint 118 and socket 116. The ball and socket joints may be configured such that the ball joint may be removeably inserted into the corresponding socket. As aforementioned, the ball and socket joint is beneficial because it provides translational fixed degree of freedom while allowing the rotation of the mast 104 relative to the mobile robot 100 to be free (or free to a certain degree). The ball and socket joint also allows the mast 104 to be dislodged from the mobile robot 100 without any parts of the mast breaking during the dislodging process. Further, once dislodged, the mast may be reinstalled by inserting the ball joints into respective socket joints, essentially snapping them back into place with a moderate force.

The specific configuration shown in the figure with the two ball and socket joints may be beneficial because it provides additional structural support than a single ball and socket joint, while still allowing for the mast 104 to relatively freely rotate. In one or more embodiments, the two ball and socket joints may be aligned with the direction of travel of the mobile robot 100. That is, a first imaginary axis that is parallel with the direction of travel of the mobile robot (which may be referred to as a "longitudinal axis") may intersect both the first ball and socket joint 108 and the second ball and socket joint 114. Providing the ball and socket joints in this configuration may be beneficial in that the mast connector may be more resilient to forces resulting from the momentum of the mobile robot 100 as it travels forwards and backwards. However, the ball and socket joints may also be positioned "side-by-side" such that a second imaginary axis intersecting both ball and socket joints would be perpendicular to the first imaginary axis. Additional details about the ball and socket joints may be provided in FIGS. 6A-6B.

The mast connector 106 may also include a gasket 119. The gasket 119 may be provided between the mast 104 and the mounting bracket 128 and may form a seal between the mast 104 and the mounting bracket 128. However, in some instances, the mast connector 106 may instead be connected directly to the mobile robot 100 without the use a mounting bracket 128. In such instances, the gasket 119 may form a seal directly between the mast 104 and the mobile robot 100. The gasket 119 allows for some degree of tolerance in the interface between the mast 104 and the mounting bracket 128 and provides protection to components within the mast, the mounting bracket 128, and/or the mobile robot from external conditions, such as moisture, etc. The gasket 119 is further illustrated in FIGS. 2-3

In one or more embodiments, the gasket 119 may also include one or more elements that may be used to provide points of connection between the gasket 119 and the mast 104 and/or the mounting bracket 128. These elements may assist in securing the gasket 119 to the mast 104 and/or the mounting bracket 128 to provide a more effective seal between the mast 104 and the mounting bracket 128. For example, as shown in the figure, the gasket 119 may include one or more T-tabs (for example, T-tab 122 and T-tab 124, as well as any other number of T-tabs. The T-tabs may be rubber elements that may protrude from the gasket 119 and may engage with a portion of the mast 104 to provide a point of connection between the gasket 119 and the mast 104. The gasket 119 may also include a plug 120. The plug may also be a rubber element that protrudes from the gasket 119 and engages with the mast 104. Particularly, the plug 120 may include a protrusion that may be configured to insert into a fastener access hole 126 included in the mast 104. The fastener access hole 126 may be configured to receive a fastener (such as a screw, for example). The plug 120 may be inserted into the fastener access hole 126 over the fastener to cover the fastener and provide another point of connection between the gasket 119 and the mast 104. One of ordinary skill in the art would understand that this configuration of the gasket 119 is merely exemplary, and the gasket 119 may also be configured to include any other types of elements that may be used to provide points of connection between the gasket 119 and the mast 104 and/or the mounting bracket 128.

Figure 2B:
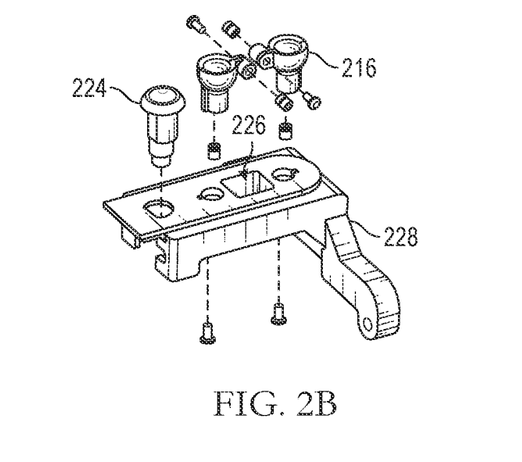
FIG. 2B is an illustration of an exploded view of a mounting bracket in accordance with one or more example embodiments of the disclosure.

FIGS. 2A-2B show illustrations of an exploded view of the mast 200 and the mounting bracket 228 in accordance with one or more example embodiments of the disclosure.

In one or more embodiments, the mast 200 may include at least a stem 204 that may serve as one of the primary structural components of the mast. That is, the stem 204 may provide rigidity along the length of the mast 200 to maintain the mast in an elongated state. The stem 204 may also serve as a structure to which other components of the mast may be attached, as is described in additional detail below. The stem 204 may extend the length of the mast 200. The stem 204 may comprise any number of different types of rigid materials, such as metals, plastics, etc.

The mast 200 may also include a lighting element, which may be used to emit light to illuminate the mast 200 to provide visibility to the mobile robot as it traverses an environment (for example, to perform package deliveries). The lighting element, for example, may be provided in the form of a LED flexible printed circuit assembly (FPCA) 206. The LED FPCA 206 may be a flexible circuit board comprising one or more LEDs for producing any number of different types of light patterns. The LED FPCA 206 may be provided on the exterior portion of the stem 204 to allow for maximum visibility of the LEDs within the environment in proximity to the mobile robot on which the mast 200 is attached. However, the LED FPCA 206 may also be provided on any other portion of the stem 204 and/or any other portion of the mast 200 in general. Additionally, the lighting element may also include any other type of light source capable of producing light illuminations from the mast 200.

In one or more embodiments, the mast 200 may also include any other type of visual indicator other than a lighting element. For example, the mast 200 may include a flag, a reflective material, a noticeable color, and/or any other visual indicator that may be used to provide additional visibility to the mobile robot. That is, the mast 200 may not necessarily require a lighting element that emits light.

The mast 200 may also include one or more lenses 208. The one or more lenses 208 may be included within the mast 204 to disperse light produced by the LED FPCA 206. For example, the one or more lenses 208 may be provided between the LED FPCA 206 and the external environment such that the one or more lenses 208 may modify the direction of the illumination of the light produced by the LED FPCA 206.

The mast 200 may also include one or more different types of sensors. For example, the mast 200 may include an ambient light sensor. The ambient light sensor may be used to detect a level of ambient light in the environment in which the mobile robot is traversing. This information may then be used to determine how to operate the lighting element of the mast 200. For example, if the ambient light sensor determines that the ambient light in the environment is low (e.g., during nighttime), the lighting element may remain on at all times. In contrast, if the ambient light sensor determines that the light in the environment is high (e.g., during daytime), then the lighting element may only be used to produce illumination providing specific information to users in the environment. For example, when the ambient light is determined to be high, then the lighting element may only be illuminated in certain instances, such as illuminating a red light to indicate a braking action of the mobile robot. This is because the mobile robot and mast 200 may be more visible in high ambient light conditions, so the illumination from the lighting element may not be as critical to provide visibility to the mobile robot. Similarly, the intensity of the light produced by the lighting element may be adjusted based on the detected amount of ambient light.

The mast 200 may also include any other types of sensors as well (for example, location sensors, sensors to detect a breakage of the mast 200 from the mobile robot, a disconnection of an electrical connection (described below), etc.

Figure 3:
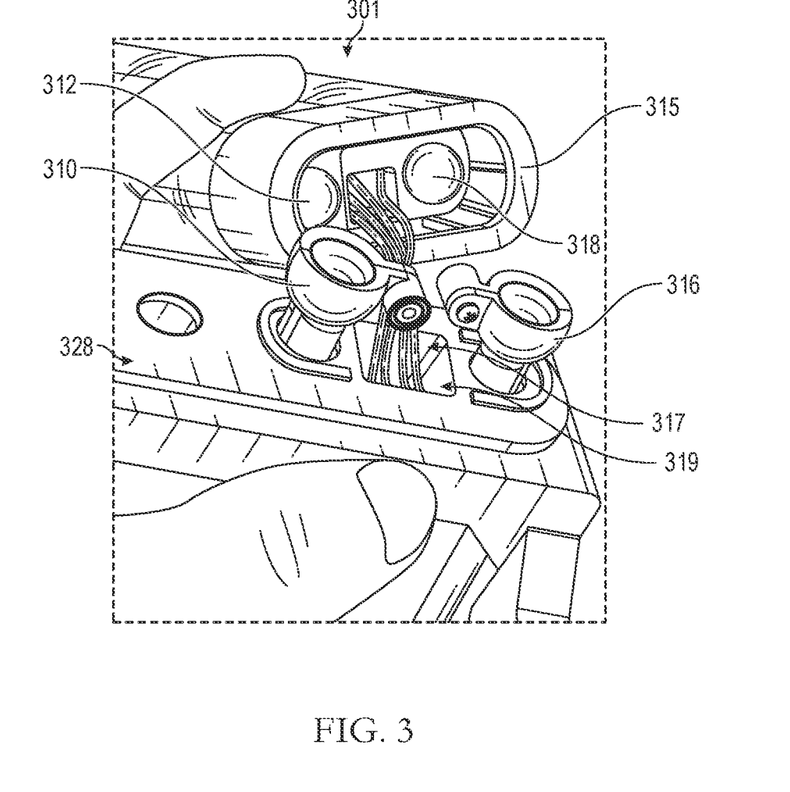
FIG. 3 is an illustration of a mast that is disconnected from a mounting bracket on the mobile robot in accordance with one or more example embodiments of the disclosure.

Described in additional detail with respect to FIG. 3, the mast 200 may also include an electrical connection (not shown in the figure). The electrical connection may be used to exchange power and/or other types of electrical signals between the LED FPCA 206 (and/or any other electrical components that may be located in the mast 200) and any electrical components included in the mobile robot. For example, the mobile robot may include one or more power sources, one or more controllers used to perform processing and control signals to the LED FPCA 206, and/or any other types of electrical components.

The electrical connection may include one or more wires than may be provided through the interior of the stem 204 (and the opening 226 of the mounting bracket 228, if applicable) and may be connected to the LED FPCA 206 through a connector at the top of the LED FPCA 206. However, the electrical connection may also be facilitated through any other wired or wireless electrical connections, as described in FIG. 3. The electrical connection may also comprise multiple separate electrical connections (for example, a dedicated connection for power transfer between the mast 200 and the mobile robot and a separate connection for data transfer between the mast 200 and the mobile robot).

Figure 4:
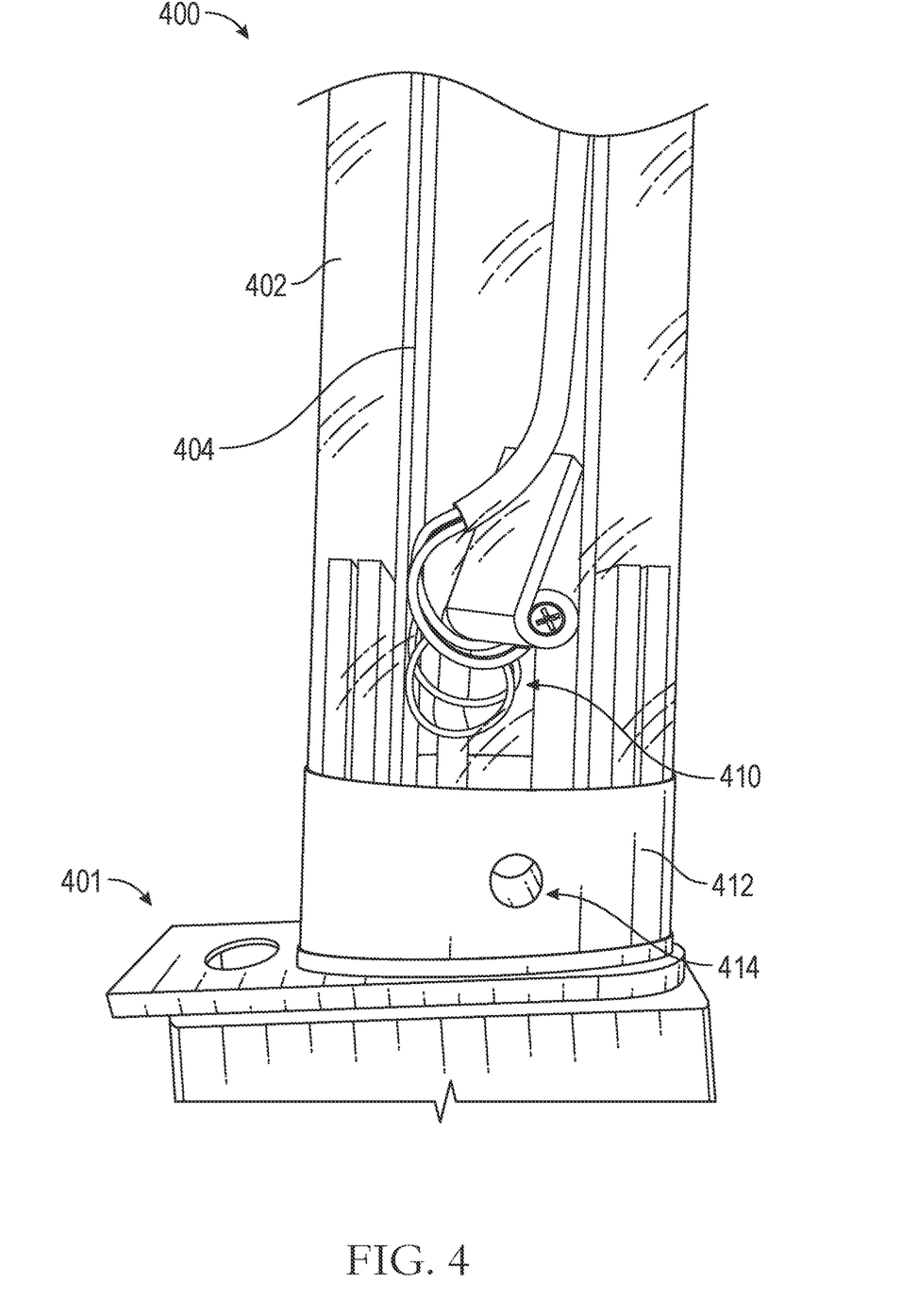
FIG. 4 illustrates a mast that is connected to a mounting bracket on the mobile robot in accordance with one or more example embodiments of the disclosure.

The mast 200 may also include an outer housing (not shown in the figure, but illustrated in further detail in FIG. 4). The outer housing may encompass the stem 204, the LED FPCA 206, the lenses 208, and/or any other element associated with the mast 200, and may protect these components of the mast 200 from the external environment.

The mast may be removeably affixed to the mobile robot through a mounting bracket 228. That is, the mounting bracket 228 may be attached to the body of the mobile robot (not shown in the figure). However, in some embodiments, the mast 200 may be affixed directly to the mobile robot without the use of the mounting bracket 228. The mounting bracket 228 may also include any other number of components as well, such as the switch 224. The switch 224 may serve as an on/off switch that may allow a user to manually turn on or off the lighting illumination from the mast through the LED FPCA 206. The mounting bracket 200 may also include an opening 226. The opening 226 may be provided within the mounting bracket 228 to allow for any wired electrical connections (for example, one or more wires) to be fed from the mobile robot, through the mounting bracket 228, and to the mast 200. The specific physical configuration of the mounting bracket 228 illustrated in the figure is merely exemplary and is not intended to be limiting in any way. The mounting bracket 228 may also be any other size and/or shape.

The figure also shows the gasket 219 (which may be similar to the gasket 119), which may be provided between the mast 200 and the mobile robot (for example, through the mounting bracket 228). As shown in the figure, the gasket 219 may be configured in a different manner than the gasket 119. For example, instead of including T-tabs, the gasket 219 may instead include two protruding elements that may be used to connect the gasket 219 to the stem 204. Particularly, the two protruding elements may connect the gasket 219 to the stem 204 from the interior portion of the stem 204. However, this is merely another example of a gasket configuration, and the gasket may similarly be configured to connect to the mast 204 and/or the mounting bracket 228 in any other manner.

This engagement and disengagement between the mast 200 and the mounting bracket 228 may be facilitated through one or more ball and socket joints that together comprise the mast connector. Particularly, the one or more sockets 216 may be affixed to the mounting bracket 228 and the one or more ball joints 222 may be affixed to the mast. However, this is merely exemplary and the one or more sockets 216 and the one or more ball joints 222 may be affixed to either the mast or the mounting bracket 228 in any other number of configurations (for example, the one or more sockets 216 may instead be affixed to the mast). In any configuration, given that the one or more sockets 216 and the one or more ball joints 222 are affixed to the mast and the mounting bracket 228, the engagement of the one or more sockets 216 and the one or more ball joints 222 may result in the engagement of the mast and the mounting bracket 228 (and also the mast and the mobile robot). Likewise, disengagement of the one or more sockets 216 and the one or more ball joints 222 may result in the disengagement of the mast from the mounting bracket 228 and the mobile robot. This allows for quick engagement and disengagement of the mast to and from the mobile robot.

The one or more sockets 216 may be affixed to the mounting bracket 228 in any suitable manner. For example, as illustrated in the figure, the one or more sockets 216 may be affixed to the mounting bracket 228 using one or more screws (however, any other type of fastener may also be used). This may enable replacement of the sockets, as may be desired from time to time if the sockets lose their shape. A further illustration of the ball and socket joint in a disengaged state is provided in FIG. 3.

FIG. 3 is an illustration of a mast that is disconnected from a mounting bracket 328 on the mobile robot in accordance with one or more example embodiments of the disclosure.

Particularly, the figure illustrates the mast 301 when it is disengaged from the mounting bracket 328 of the mobile robot (not shown in the figure). The mast 301 includes the gasket 315 and the one or more ball joints (for example, ball joint 312 and ball joint 318). That is, the one or more ball joints may be attached to the mast 301 such that when the mast 301 is disengaged from the mobile robot, the one or more ball joints remain attached to the mast 301.

Likewise, the one or more sockets (for example, socket 310 and socket 316) are shown as being attached to the mounting bracket 328, and thus attached to the mobile robot. That is, the one or more sockets may be attached to the mounting bracket 328 such that when the mast 301 is disengaged from the mobile robot, the one or more sockets remain attached to the mobile robot. To re-engage the mast 301 with the mobile robot, the one or more ball joints may simply be inserted into the one or more sockets. For example, ball joint 312 may be inserted into socket 310 and ball joint 318 may be inserted into socket 316 (or vice versa).

The configuration shown in the figure with the one or more ball joints being attached to the mast 301 and the one or more sockets being attached to the mounting bracket 328 is merely exemplary. For example, the one or more ball joints may also be attached to the mounting bracket 328 and the one or more sockets may be attached to the mast 301. Further, in embodiments in which the mounting bracket 328 is not used, the one or more ball joints or one or more sockets may simply be connected directly to the mobile robot.

Also illustrated is an electrical connection 317 (for example, one or more wires) extending between the mast 301 and the mobile robot. The electrical connection 317 may allow for power and control signals to be exchanged between any electronics included in the mast 401 and any electronics included in or on the mobile robot. For example, the electrical connection 317 may be used to provide power and control signals to the LED FPCA 206 of FIG. 2. As another example, the electrical connection 317 may allow data from sensors in the mast 301 to be provided to electronics in the mobile robot for processing. In embodiments in which the electrical connection 317 comprises a wired connection (as illustrated in the figure), the mounting bracket 328 may include an aperture 319 to allow the electrical connection 317 to pass through the mounting bracket and into the mobile robot (such that the wired connection may be connected to the electronics within or on the mobile robot).

In one or more embodiments, the electrical connection 317 may remain in place even when the mast 301 is disconnected from the mobile robot. In some cases, a tether (not shown in the figure) may also be provided that may form an additional point of connection between the mast 301 and the mobile robot when the mast 301 is disengaged from the mobile robot. This tether, for example, may be a metallic cable. However, the tether may be any other type of flexible element that may serve as a physical connection between the mast 301 and the mobile robot.

The tether may serve to maintain a physical connection between the mast 301 and the mobile robot even if the mast 301 is disengaged from the mobile robot. This may prevent the mast 301 from falling off the mobile robot and being left behind as the mobile robot continues to traverse an environment. This may also prevent the mast 301 from being tampered with and/or stolen from the mobile robot by a person in the environment. While the electrical connection 317 may inherently provide such a connection between the mast 301 and the mobile robot, the tether may provide a primary (and stronger) point of connection so as not to rely on the wires comprising the electrical connection 317 for maintaining the physical connection between the mast 301 and the mobile robot, which may result in damage to the electrical connection 317 and/or electrical components to which they are connected. In some examples, the tether is therefore shorter than electrical connection 317, such that the tether maintains the physical connection rather than the electrical connection 317.

The mast 301 and/or the mobile robot may also comprise any number of different types of sensors that may be used to detect when the mast 301 is disengaged from the mobile robot. For example, one or more sensors may be provided within the one or more sockets that may detect when the one or more ball joints are removed from the sockets. The sensors may include, for example, Hall Effect sensors, proximity sensors, light sensors, and/or any other types of sensors. The one or more sensors may also be provided at any other location on the mast 301 and/or the mobile robot to detect the disengagement. Upon detection that the mast 301 is no longer connected to the mobile robot, as audible or visual notification may be produced by the mast 301 and/or mobile robot. In addition, should the mobile robot be equipped with mobile communication capability, a signal may be sent to the central server to indicate the mast is no longer connected to the mobile robot. Other data may be included in the signal, such as time, location, images (should the mobile robot or mast include an imaging device), etc.

Although the electrical connection 317 is shown as comprising one or more wires in the figure, this is not intended to be limiting. That is, the electrical connection 317 may also include a wireless connection between any electrical components in the mast 301 and any electrical components in the mobile robot. For example, power may be transferred between the mast 301 and the mobile robot using wireless power transfer, such as between a coil included in the mobile robot and a second coil included in the mast 301 (using inductive coupling). Power may also be wirelessly transferred between the mast 301 and the mobile robot in any other suitable manner.

Similarly, electrical signals other than power may also be transferred between the electronics included in the mast 301 and the electronics included in the mobile robot using one or more wireless connections. For example, the mast 301 and the mobile robot may include a wireless transmitter and/or receiver that may be configured to transmit signals wireless using any number of short-range wireless transmissions protocols, such as Bluetooth, dedicated short-range communication (DSRC), near-field communication (NFC), etc. Signals may also be transmitted between the mast 301 and the mobile robot using any other wireless signal transmission mechanisms.

The electrical connection may also include a connection that may be a physical connection, but a physical connection involving two portions that may be separated when the mast 301 is disengaged from the mobile robot (unlike the wires shown in the figure). For example, the connection may also include one or more pogo pins and/or any other type of electrical connector.

FIG. 4 illustrates a mast 400 that is connected to a mounting bracket 401 on the mobile robot in accordance with one or more example embodiments of the disclosure. The figure serves to further illustrate the configuration of the mast 400. For example, the figure shows that the mast 400 may comprise a stem 404 (for example, the stem 204 of FIG. 2) that is included within an outer housing 402. The outer housing 402 may encompass some or all of the elements of the mast 400 in addition to the stem 204, such as the LED FPCA 206, the lenses 208, the electrical connection 410, etc. The outer housing 402 may serve to protect the elements of the mast 402 from the external environment (for example, from weather conditions, tampering, etc.). The outer housing 402 may also comprise a transparent or semi-transparent material so as to allow light generated by the mast 400 from being visible within the external environment. For example, the outer housing 402 may comprise a plastic material, a glass material, and/or any other type of transparent or semi-transparent material.

In one or more embodiments, the outer housing 402 may be affixed to the mast 400 through a fastener accessible via a hole 414 included on a bottom portion 412 of the outer housing 402. However, the outer housing 402 may be affixed to the mast 400 through any other mechanism as well. The bottom portion 412 may include the ball and socket joints (for example, as shown in FIG. 3).

FIG. 5 illustrates a schematic of another embodiment of a mast connector 508 in accordance with one or more example embodiments of the disclosure.

Similar to the mast connector 106, the mast connector 508 may involve the use of a ball and socket joint 506. However, the mast connector 508 may only include one ball and socket joint 506 and may also include a spring 511 attached between the ball joint 507 of the ball and socket joint 506 and the mast 504. The spring 511 may also (or may only be) attached to a top cover 512 attached to the mobile robot 502).

The socket 509 of the ball and socket 506 may be a portion of the mobile robot 502 that is configured to receive the ball joint 507. The socket 509 may be configured in any form (for example, cut into the mobile robot 502 as shown in the figure, a protrusion from the mobile robot 502, etc) Similar to any of the other ball and socket joints associated with any other embodiments described here, the use of the ball and socket joint 506 may provide a limited amount of movement freedom to the mast 504 (for example, allow the mast 504 to tilt in various directions while maintaining a connection with the mobile robot 502.)

While the mast 504 may be provided a limited freedom of motion through the ball and socket joint 506, the spring 511 may exist to rectify any movement of the mast 504 and return the mast 504 to an equilibrium position (for example, positioned vertically as shown in the figure). For example, if the mast 504 is tilted to any angle, the spring 511 will be compressed to one side. The spring 511 may then work to counteract this compression and return to an equilibrium which may move the mast 504 back towards equilibrium as well. In addition, the resistance to movement is the same in any direction the mast moves, whereas in some embodiments the freedom and resistance to movement is directional.

Figure 6A:
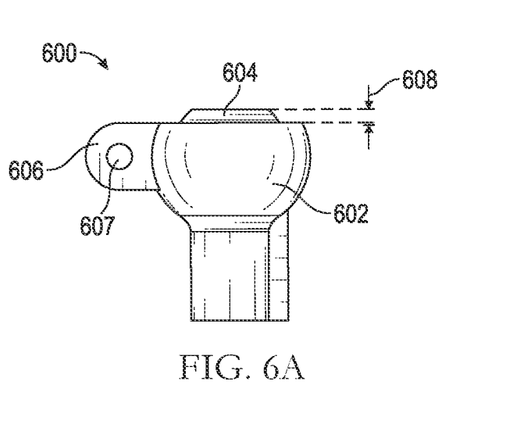
FIG. 6A illustrates a side view of a ball and socket joint of the mast connector in accordance with one or more example embodiments of the disclosure.
Figure 6B:
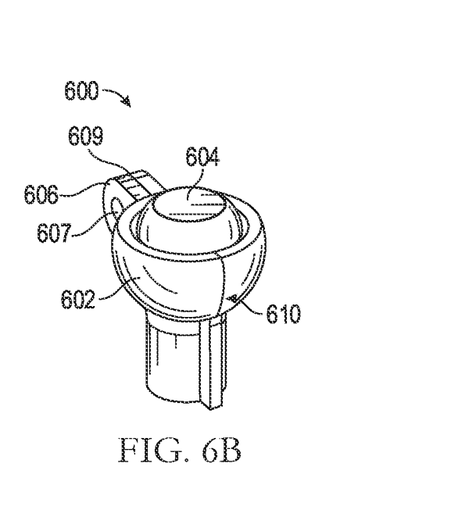
FIG. 6B illustrates a perspective view of a ball and socket joint of the mast connector in accordance with one or more example embodiments of the disclosure.

FIGS. 6A-6B illustrate different views of a ball and socket joint 600 of the mast connector in accordance with one or more example embodiments of the disclosure. The ball and socket joint 600 may be the same as, or similar to, any other ball and socket joint described herein (for example, ball and socket joint 108, ball and socket joint 114, and/or any other ball and socket joint). The ball and socket joint 600 comprises a socket 602 and a ball joint 604 that may be removeably inserted into the socket 602.

The ball joint 604 may be a spherical, semi-spherical, or otherwise rounded element that may be comprised of any number of different types of materials. For example, the ball joint 604 may comprise a metallic material, a plastic material, and/or any other type of material. Likewise, the socket 602 may also comprise any number of different types of materials. In some instances, the material comprising the socket 602 may be a more flexible material than the material comprising the ball joint 604. This may provide a degree of flexibility in the socket 602 such that the ball joint 604 may be removeably inserted into the socket 604 (and may dislodge from the socket 604 in situations where it may be desirable for the mast to break away from the mobile robot, such as during an impact event of the mast that exceeds a threshold force).

One benefit of the ball and socket 600 described herein is that the socket 602 may be configured to decrease or increase the amount of force required to remove the ball 604 from the socket 602, and likewise the amount of force required for the ball 604 to be inserted into the socket 602. The socket 602 may be configured to decrease or increase these required forces in a number of different ways.

As a first example, the height 608 of the socket 602 may be modified to decrease and/or increase these required forces. Particularly, a height of the "cup" of the socket 602 may be modified, which may impact the distance 608 the ball joint 604 protrudes from the top of the socket 602 when the ball joint 604 is fully inserted into the socket 602. Using a socket 604 with a greater height may result in the distance 608 the ball joint 604 protrudes from the top of the socket 602 being smaller. This may increase the amount of force required to insert the ball joint 604 into the socket 602 and the amount of force required to dislodge the ball joint 604 from the socket 602. This is because in this configuration the ball joint 604 may be more fully encompassed by the socket 602 than if the height of the socket 602 were shorter such that more of the ball joint 604 would protrude from the socket 602.

As a second example, the socket 602 may include a slit, and a size of a split 610 may be adjusted. The split 610 may be a gap in the socket 602 that extends vertically down a portion of the socket 602. The split 610 may provide a certain amount of "give" in the socket 602 such that the split in the socket 602 may spread by a particular amount to allow for the ball joint 604 to be more easily removed and/or inserted into the socket 602. A wider and/or longer split 610 may result in the requisite forces being lower than a narrower and/or shorter split 610. In some cases, the split 610 may not necessarily involve a gap in the socket material. That is, both sides of the split 610 may be touching (as shown in the figure), but still may be physically separable such that a gap may be created when the ball joint 604 is inserted into the socket 602 or removed from the socket 602.

As a third example, the socket 602 may include a protrusion 606 including a hole 607 for receiving a fastener (not shown in the figure). The fastener may be inserted into the hole 607 and tightened to increase the force required for the ball joint 604 to be disconnected from the socket 602. For example, the force produced by the fastener as it is tightened may decrease the width of the split 609. In some cases, tightening the tab 606 may also have the effect of tightening split 610 as well (the split 609 and the split 610 may also be one continuous split). The use of the fastener may provide the additional benefit of allowing adjustments to be performed to the socket 602 after the ball joint 604 is inserted into the socket 602. In this manner, the force required to insert the ball joint 604 into the socket 602 may be maintained at a lower level to allow for easier insertion, and the force required to disconnect the ball joint 604 from the socket 602 may then be increased by tightening the fastener. This provides for an easier connection to be made between the ball joint 604 and the socket 602.

Figure 7:
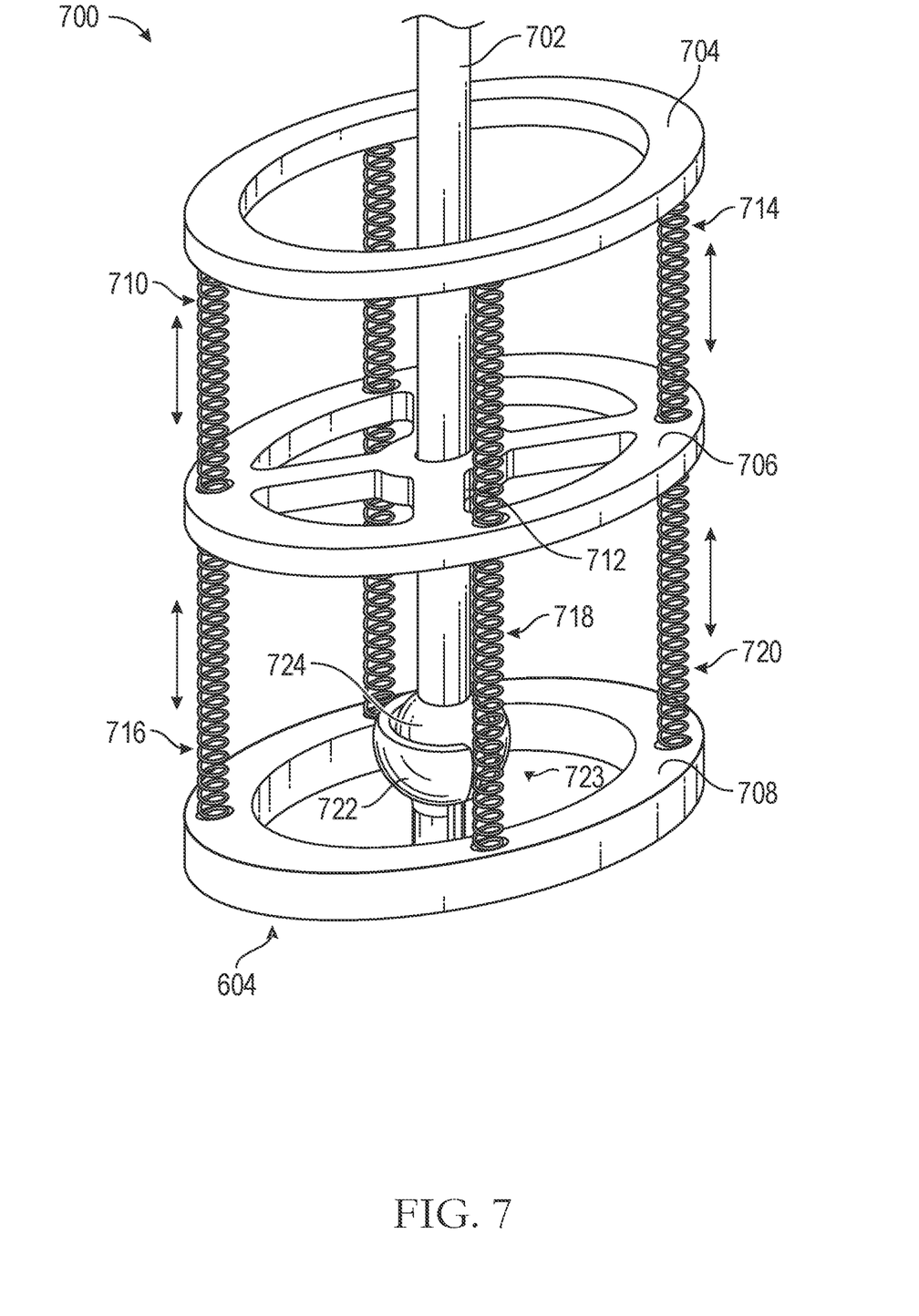
FIG. 7 is an illustration of a schematic of another embodiment of a mast connector in accordance with one or more example embodiments of the disclosure.

FIG. 7 is an illustration of a schematic of another embodiment of a mast connector 700 in accordance with one or more example embodiments of the disclosure.

The mast connector 700 includes at least a first ring 704, a second ring 706, and a third 708 ring. The first ring 704 and the third ring 708 may be directly affixed to the mobile robot (not shown in the figure). In this manner, the first ring 704 and the third ring 708 may be rigid and may remain fixed with respect to the movement of the mast 702.

In contrast, the second ring 706 may not be directly affixed to the mobile robot, but may instead by affixed to the mast 702. The second 706 ring may thus freely move along with the movement of the mast 702 and may move relative to the first ring 704 and the third ring 708 (and the mobile robot). The second ring 706 may also be attached to the first ring 704 and the third ring 708 through one or more springs (for example, springs 710, 712, 714, 716, 718, 720, and/or any other number of springs). As shown in the figure, the one or more springs may be vertically-arranged, such that some of the springs may be connected from the top of the second ring 706 to the bottom of the first 704, and some of the springs may be connected from the bottom of the second ring 706 to the top of the first ring 708.

The springs may serve as self-correction mechanisms by which the mast 702 may be returned to a center position within the rings (for example, a position at which the mast 702 is vertical and is not tilted to a side at an angle). As the mast 702 leans to any given side during operation of the mobile robot (for example, a result of a moment arm created by the mast 702 during movement of the mobile robot, as described above), some of the springs may be compressed and some of the springs may be extended. These forces produced on the springs by the movement of the mast 702 may be counterbalanced by the springs themselves, which may function to reduce the compression and extension forces and move back to an equilibrium position (thus serving to move the mast 702 back to the center position as well). For example, if the mast 702 were to tilt in a direction towards the spring 714, a first distance between a side of the second ring 706 including the spring 714 and the first ring 704 may increase, which may cause the spring 714 to extend. Likewise, a second distance between a side of the second ring 706 including the spring 710 and the first ring 704 may decrease, which may cause the spring 710 to compress. In this scenario, the spring 714 may work to reduce the extension (effectively returning the first distance back to the original distance) and the spring 710 may work to reduce the compression (effectively returning the second distance back to the original distance). These countermeasures performed by the spring 714 and the spring 710 may serve to return the second ring 706 back to its original position, and, in turn, the mast 702 back to its original position. This is merely a simplified exemplification of how the springs may be used to return the mast 702 to a starting position after a tilting of the mast 702 occurs. One of ordinary skill in the art would understand that any of the other springs may also be involved in this process as well.

The mast connector 702 also includes the mast 702 itself, which extends through the center portions of the first ring, 704, the second ring 706, and the third ring 708. In this manner, the lateral movement of the mast 702 may be limited to the space within the center portion of the first ring 704 and the second ring 708 or a distance allowed by the of the various springs (whichever distance is greater). This may reduce the ability of (or prevent) the mast 702 from tilting beyond a particular angle during operation of the mobile robot.

The mast connector 702 may also be attached to a ball and socket joint 723 positioned at the bottom of the mast connector 700. The ball and socket joint 723 may include a ball joint 724 and a socket 722. The socket 722 may be attached to the mobile robot (similar to the first ring 704 and the third ring 708) and the ball joint 724 may be attached to the mast 702. The ball joint 724 may be removeably inserted into the socket 722 to facilitate the connection between the mast 702 and the mobile robot. Similar to the ball and socket joints illustrated in FIGS. 1-3 and 6A-6B, the ball and socket joint 723 may function to allow the mast 702 to be removeably attached to the mobile robot, while also allowing the mast 702 to move relative to the mobile robot to reduce the impact of the large moment arm created by the mast 702.

One of ordinary skill in the art would appreciate that the specific configuration illustrated in the figure is merely exemplary and is not intended to be limiting. For example, in another possible configuration, the third ring 708 may not be necessary and instead the springs attached to the bottom of the second ring 706 may simply be attached to a frame of the mobile robot. Any of the rings may also be any other size and may also be any other shape as well (for example, the rings do not necessarily even need to be ring-shaped. These are just a few additional examples of how the configuration may potentially be altered.

Figure 8:
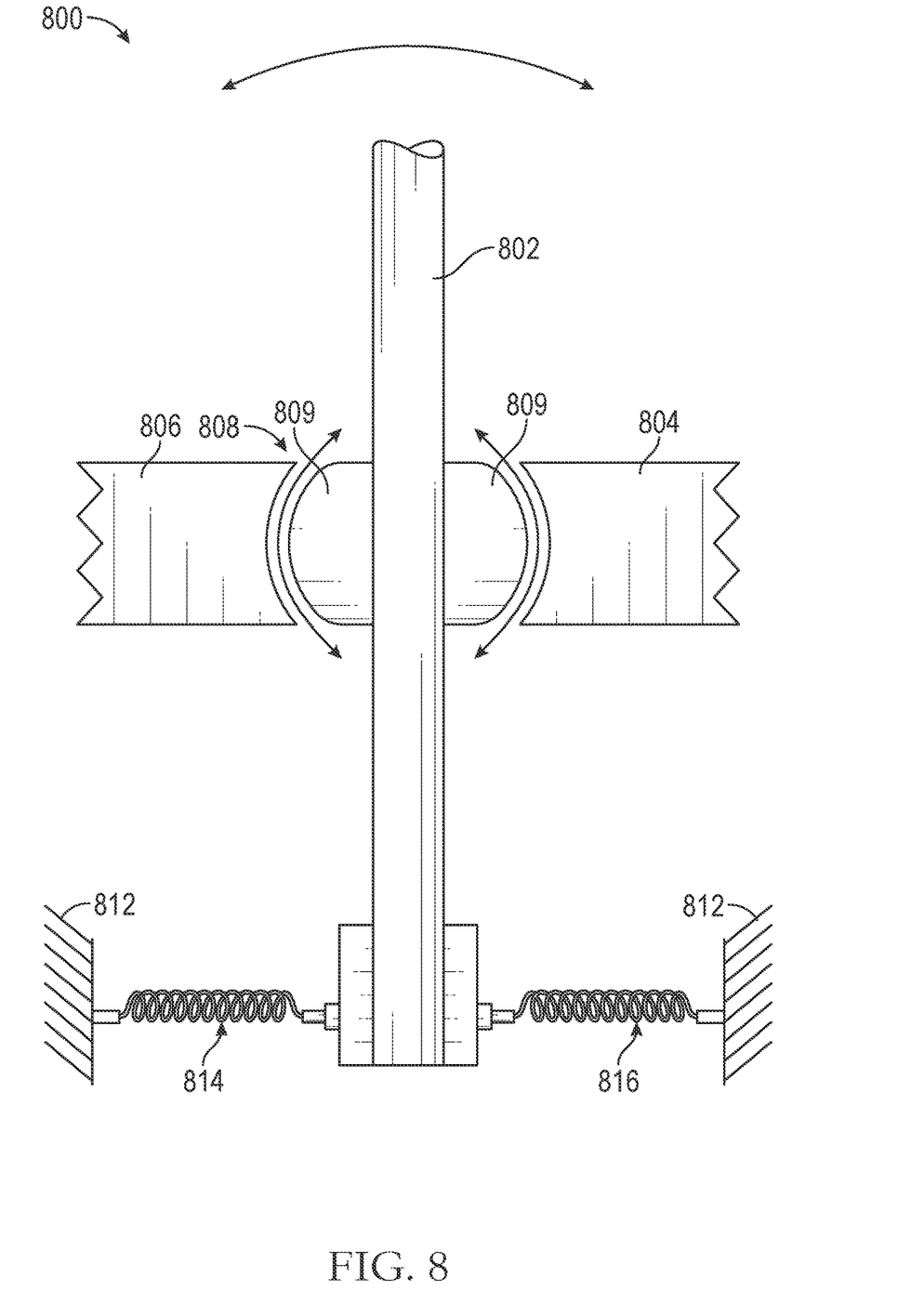
FIG. 8 is an illustration of a schematic of another embodiment of a mast connector in accordance with one or more example embodiments of the disclosure.

FIG. 8 is an illustration of a schematic of another embodiment of a mast connector 800 in accordance with one or more example embodiments of the disclosure. Particularly, the figure may illustrate a cross section of the mast connector 800.

In this mast connector 800, the mast 802 may be affixed to a ball joint 809 and one or more springs (for example, a first spring 814, a second spring 816, and/or any other number of springs). The ball joint 809 may be provided around the mast 802 and may be inserted into a socket 808 between two "shelves" (for example, a first shelf 804 and a second shelf 806). The shelves may be affixed to the mobile robot such that the shelves are rigid and may not move with the movement of the mast 802. The shelves may be configured such that they may receive the ball joint 809. The shelves may also be configured such that the ball joint 809 may be removeably inserted into the socket 808, however, a threshold amount of force may be required to insert the ball joint 809 into the socket 808. This may ensure that a particular amount of force is also required for the ball joint 809 to be removed from the socket 808 to prevent the ball joint 809 from unexpectedly falling out of the socket 808 during operation of the mobile robot. The combination of the ball joint 809 and the shelves may form a ball and socket joint that may allow for limited movement of the mast 802 relative to the mobile robot.

The one or more springs may be affixed between a bottom portion of the mast 802 on one side and the mobile robot on the other side Similar to the springs illustrated in the mast connector 700, the springs in the mast connector 800 may serve to counteract tilting motions of the mast 802 to return the mast 802 back to an equilibrium position (for example, a position in which the mast 802 is vertical). As one non-limiting example, if the mast 802 were to tilt in a direction towards the second shelf 806, the ball joint 809 may rotate within the socket 808 and the bottom of the mast 802 may rotate in a direction towards the first portion 812 of the mobile robot. This may cause the first spring 814 to compress and the second spring 816 to extend. The first spring 814 and the second spring 816 may then work to counteract these forces to return the mast 802 to its original position.

One of ordinary skill in the art would appreciate that the specific configuration illustrated in the figure is merely exemplary and is not intended to be limiting. For example, the ball joint 809 and/or the springs may be attached to any other portion of the mast 802 as well.

Figure 9:
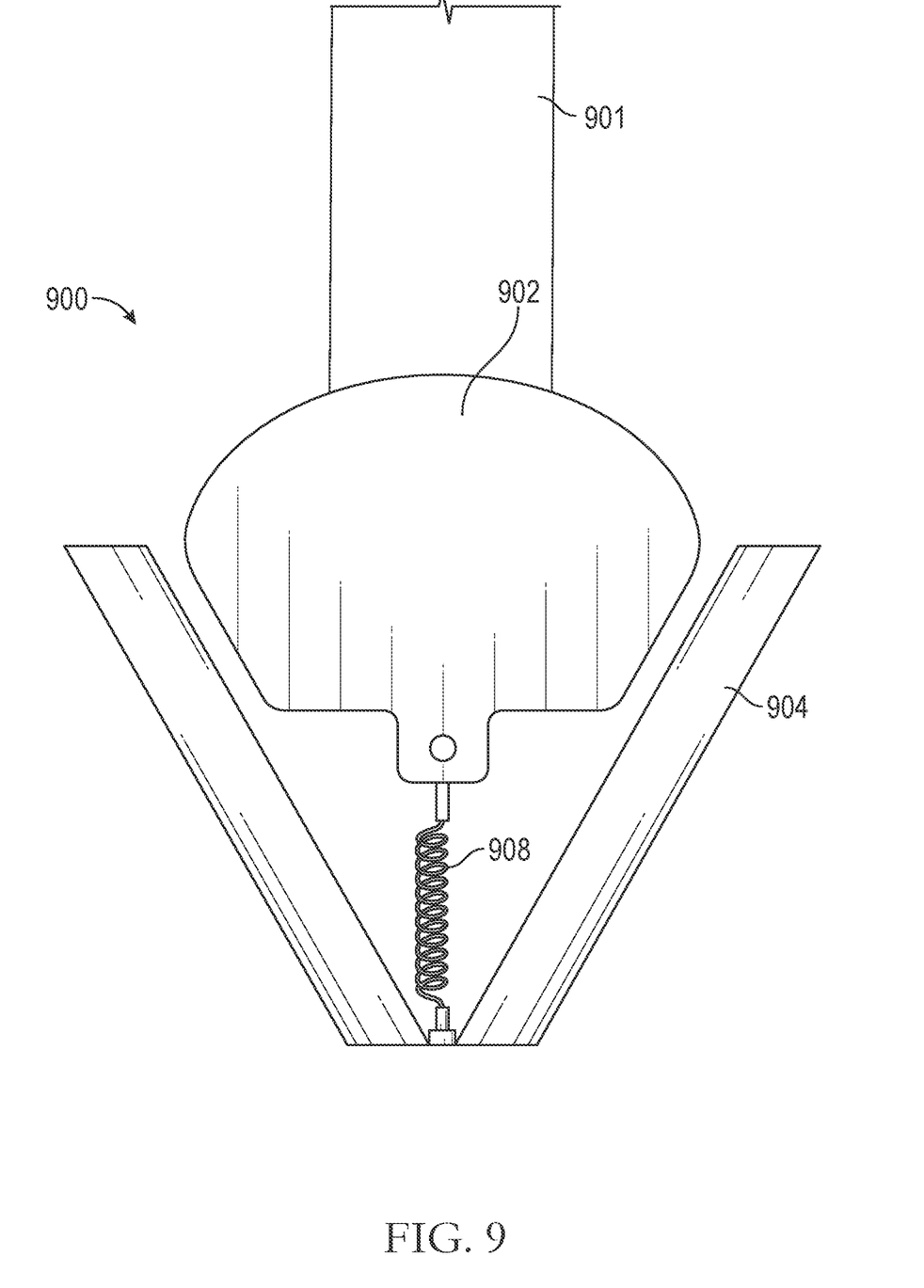
FIG. 9 is an illustration of a schematic of another embodiment of a mast connector in accordance with one or more example embodiments of the disclosure.

FIG. 9 is an illustration of a schematic of another embodiment of a mast connector 900 in accordance with one or more example embodiments of the disclosure. Particularly, the figure may illustrate a cross section of the mast connector 900.

In this mast connector, the mast 901 may be affixed to a ball joint 902 (for example, to a top portion of the ball joint 902). The ball joint 902 may be provided within a socket 904. The socket 904 may differ from the sockets included in any of the other embodiments in that the socket may be a v-shaped socket rather than a cup-shaped socket. The ball joint 902 may also be affixed to a first end of a spring 908 (for example, at a bottom portion of the ball joint 902). A second end of the spring 908 may be affixed to the mobile robot (not shown in the figure).

The spring 908 provides a tension force on the ball joint 902 that pulls the ball join 902 into the socket 904. Any moment applied to the ball joint 902 through movement of the mast may pivot the ball joint 902 within the socket 904 and may also produce a force on the spring 908 that may extend the spring 908. The spring 908 may then counteract this force and move towards equilibrium, which may also move the ball joint 902 and the mast back towards an equilibrium position as well.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A mobile robot comprising:
   a base;
   a mast comprising a visual indicator and extending vertically from the base; and a mast connector configured to removeably connect the mast and the base of the mobile robot through a mounting bracket, wherein the mast connector comprises:
   a first ball joint and a second ball joint; and
   a first socket and a second socket,
      wherein the first socket is configured to receive the first ball joint and the second socket is configured to receive the second ball joint, wherein the first ball joint and the second ball joint are attached to either the mast or the mounting bracket, and wherein the first socket and the second socket are attached to either the mast or the mounting bracket,
      wherein the first ball joint and the second ball joint are configured to dislodge from the first socket and the second socket based on a threshold holding force being exceeded.

2. The mobile robot of claim 1, wherein the mast further comprises:
   a stem;
   one or more lenses; and
   an outer housing encompassing the stem, the visual indicator, and the one or more lenses.

3. The mobile robot of claim 1, wherein the first socket further comprises a gap, wherein an amount of force required to insert the first ball joint into the first socket and an amount of force required for the first ball joint to be dislodged from the first socket is based on a size of the gap.

4. The mobile robot of claim 1, wherein the first socket further comprises a fastener hole for receiving a fastener, wherein an amount of force required to insert the first ball joint into the first socket and an amount of force required for the first ball joint to be dislodged from the first socket is based on a tightness of the fastener in the fastener hole.

5. A mobile robot comprising:
   a base;
   a mast comprising:
      a visual indicator;
      a stem;
      one or more lenses; and
      an outer housing encompassing the stem, the visual indicator, and the one or more lenses; and
   a mast connector attached to the base and the mast, wherein the mast connector removeably connects the mast and the base, the mast connector comprises:
      a first ball joint and a second ball joint; and
      a first socket and a second socket, wherein the first socket is configured to receive the first ball joint and the second socket is configured to receive the second ball joint.

6. The mobile robot of claim 5, wherein the first ball joint and the second ball joint are attached to the mast, and wherein the first socket and the second socket are attached to the mobile robot.

7. The mobile robot of claim 5, wherein the visual indicator is a light emitting diode (LED) flexible printed circuit assembly (FPCA) that is provided over the stem.

8. The mobile robot of claim 5, wherein the first socket further comprises a gap, wherein an amount of force required to insert the first ball joint into the first socket and an amount of force required for the first ball joint to be dislodged from the first socket is based on a size of the gap.

9. The mobile robot of claim 5, wherein the first socket further comprises a fastener hole for receiving a fastener, wherein an amount of force required to insert the first ball joint into the first socket and an amount of force required for the first ball joint to be dislodged from the first socket is based on a tightness of the fastener in the fastener hole.

10. The mobile robot of claim 5, wherein the first ball joint and first socket comprise a first ball and socket joint, wherein the second ball joint and the second socket comprise a second ball and socket joint, and wherein the first ball and socket joint and second ball and socket joint are aligned on a longitudinal axis of the mobile robot.

11. The mobile robot of claim 5, wherein the mast connector further comprises a sensor configured to determine when the first ball joint is dislodged from the first socket or the second ball joint is dislodged from the second socket.

12. A mobile robot comprising:
   a base;
   a mast comprising a visual indicator, wherein the mast is configured to dislodge from the base based on a threshold amount of force being applied to the mast; and
   a mast connector comprising:
      a first ball joint and a second ball joint; and
      a first socket and a second socket, wherein the first socket is configured to receive the first ball joint and the second socket is configured to receive the second ball joint.

13. The mobile robot of claim 12, wherein the first socket further comprises a gap, wherein an amount of force required to insert the first ball joint into the first socket and an amount of force required for the first ball joint to be dislodged from the first socket is based on a size of the gap.

14. The mobile robot of claim 13, wherein the first socket further comprises a fastener hole for receiving a fastener, wherein an amount of force required to insert the first ball joint into the first socket and an amount of force required for the first ball joint to be dislodged from the first socket is based on a tightness of the fastener in the fastener hole.

15. The mobile robot of claim 13, wherein the first ball joint and first socket comprise a first ball and socket joint, wherein the second ball joint and the second socket comprise a second ball and socket joint, and wherein the first ball and socket joint and second ball and socket joint are aligned on a longitudinal axis of the mobile robot.

16. The mobile robot of claim 13, wherein the mobile robot further comprises a sensor configured to determine when the first ball joint is dislodged from the first socket or the second ball joint is dislodged from the second socket.

17. The mobile robot of claim 12, wherein the mast further comprises:
   a stem;
   one or more lenses; and
   an outer housing encompassing the stem, the visual indicator, and the one or more lenses.

18. The mobile robot of claim 17, wherein the visual indicator is a light emitting diode (LED) flexible printed circuit assembly (FPCA) that is provided over the stem.

* * * * *